(12) United States Patent
Pedersen et al.

(10) Patent No.: US 6,988,289 B2
(45) Date of Patent: Jan. 24, 2006

(54) DOCK LEVELERS

(75) Inventors: Paul Pedersen, Guelph (CA); Jason Fowler, Guelph (CA); Wendel Goetz, Waterloo (CA)

(73) Assignee: Pentalift Equipment Corporation, Guelph (CA)

( * ) Notice: Subject to any disclaimer, the term of this patent is extended or adjusted under 35 U.S.C. 154(b) by 0 days.

(21) Appl. No.: 10/025,922

(22) Filed: Dec. 26, 2001

(65) Prior Publication Data

US 2003/0115692 A1 Jun. 26, 2003

(51) Int. Cl.
*E01D 1/00* (2006.01)

(52) U.S. Cl. .......................... 14/69.5; 14/71.3; 14/71.1
(58) Field of Classification Search ................... 14/69.5, 14/71.3, 71.1, 71.5; 244/137.2
See application file for complete search history.

(56) References Cited

U.S. PATENT DOCUMENTS

| | | |
|---|---|---|
| 2,974,336 A | 3/1961 | Kelley |
| 3,071,790 A | 1/1963 | Le Clear |
| 3,137,876 A | 6/1964 | Loomis |
| 3,167,796 A | 2/1965 | Layne |
| 3,203,002 A * | 8/1965 | McGuire .................... 14/69.5 |
| 3,235,896 A | 2/1966 | Riggs |
| 3,271,801 A | 9/1966 | Dieter |
| 3,368,229 A | 2/1968 | Pfleger |
| 3,409,922 A | 11/1968 | Beckwith et al. |
| 3,411,168 A | 11/1968 | Hecker |
| 3,486,181 A | 12/1969 | Hecker et al. |
| 3,500,486 A | 3/1970 | Le Clear |
| 3,516,103 A | 6/1970 | Hecker et al. |
| 3,528,118 A | 9/1970 | Smith |
| 3,579,696 A | 5/1971 | Hecker et al. |
| 3,606,627 A | 9/1971 | Potter |
| 3,636,578 A | 1/1972 | Dieter |
| 3,646,627 A | 3/1972 | Potter |
| 3,662,416 A | 5/1972 | Brooks et al. |
| 3,671,990 A | 6/1972 | Hovestad |
| 3,685,077 A | 8/1972 | Wiener et al. |
| 3,699,601 A | 10/1972 | Hecker, Jr. et al. |
| 3,728,753 A | 4/1973 | Beckwith et al. |
| 3,763,514 A | 10/1973 | Bishop |
| 3,786,530 A | 1/1974 | Le Clear |
| 3,882,563 A | 5/1975 | Smith et al. |
| 4,126,909 A | 11/1978 | Smith et al. |
| 4,257,136 A | 3/1981 | Loblock |
| 4,525,887 A | 7/1985 | Erlandsson et al. |
| 4,531,248 A | 7/1985 | Swessel |
| 4,689,846 A | 9/1987 | Sherrod |
| 5,123,135 A | 6/1992 | Cook et al. |
| 5,784,740 A | 7/1998 | DiSieno et al. |
| 6,125,491 A | 10/2000 | Alexander |

* cited by examiner

*Primary Examiner*—Robert E. Pezzuto
*Assistant Examiner*—Raymond W. Addie
(74) *Attorney, Agent, or Firm*—John R.S. Orange; Santosh K. Chari; Sean X. Zhang

(57) ABSTRACT

A dock leveler has a support with a deck pivotally secured to the support at one end for movement between a stored position and an elevated position. A deck lip is pivotally connected to the deck assembly for movement between a pendant stored position and a bridging position projecting from said deck assembly. A lift mechanism acts on said deck assembly to lift it toward the elevated position and a lip operating mechanism operatively connected to the lip moves it from the pendant position to the bridging position. A latch holds the lip in the bridging position. The latch releases the lip upon relative movement between the lip and the deck assembly and has a yieldable connection to permit limited pivotal movement between said lip and said deck assembly upon application of a rearward force from a vehicle to allow the lip to move to an unlatched position.

23 Claims, 10 Drawing Sheets

DOCK LEVELERS

BACKGROUND OF THE INVENTION

The present invention relates to dock levelers.

In order to transport goods between distribution points it is necessary to utilise trailers and to load and unload the goods from the trailers. Typically, the loading and unloading is performed by fork lift trucks or pallet trucks and to accommodate movement of the forklift trucks into and out of the vehicles, a loading dock is built with a height proximate to the floor of the vehicle. However, discrepancies inevitably occur between different vehicles and the height of the vehicle floor will fluctuate during loading and unloading operations as the contents of the vehicle are increased or decreased.

To establish a safe transition between the loading dock and the vehicle, dock levelers have been developed. A dock leveler provides a loading ramp in which the deck of the leveler is connected at one end to the dock and may float at the opposite end to accommodate variations in height of the vehicle. A lip is typically provided on the dock leveler at the distal end to form a bridge between the leveler and the vehicle. In order for the leveler to be deployed, the end of the deck must move vertically past the end of the vehicle but must then move the lip into a position in which it will abut with the vehicle floor to inhibit downward movement of the deck relative to the vehicle floor. To achieve this, a mechanism is provided to move the lip between a pendant or stored position to a bridging position in which the lip extends from the deck.

Because of the extended position of the lip, there is a risk of damage of the lip, the truck or the product on the truck during maneuvering of the vehicle.

It is therefore an object of the present invention to provide a dock leveler in which the above disadvantages are obviated or mitigated.

According to the present invention there is provided, a dock leveler comprising a support frame, a deck assembly pivotally secured to said frame at one end for movement between a stored position and an elevated position, a deck lip pivotally connected to said deck at an opposite end to said one end for movement between a pendant stored position and a bridging position projecting from said deck assembly. A lift mechanism acts on said deck assembly to bias it toward the elevated position, a lip operating mechanism operatively connects the lip to move it from the pendant stored position to the bridging position. A latch holds the lip in the bridging position and releases the lip upon relative movement between the lip and the deck assembly. The latch includes a yieldable connection to permit limited pivotal movement between the lip and the deck assembly when a force is applied to it.

Embodiments of the invention will now be described by way of example only with reference to the accompanying drawings in which.

Figure 1:
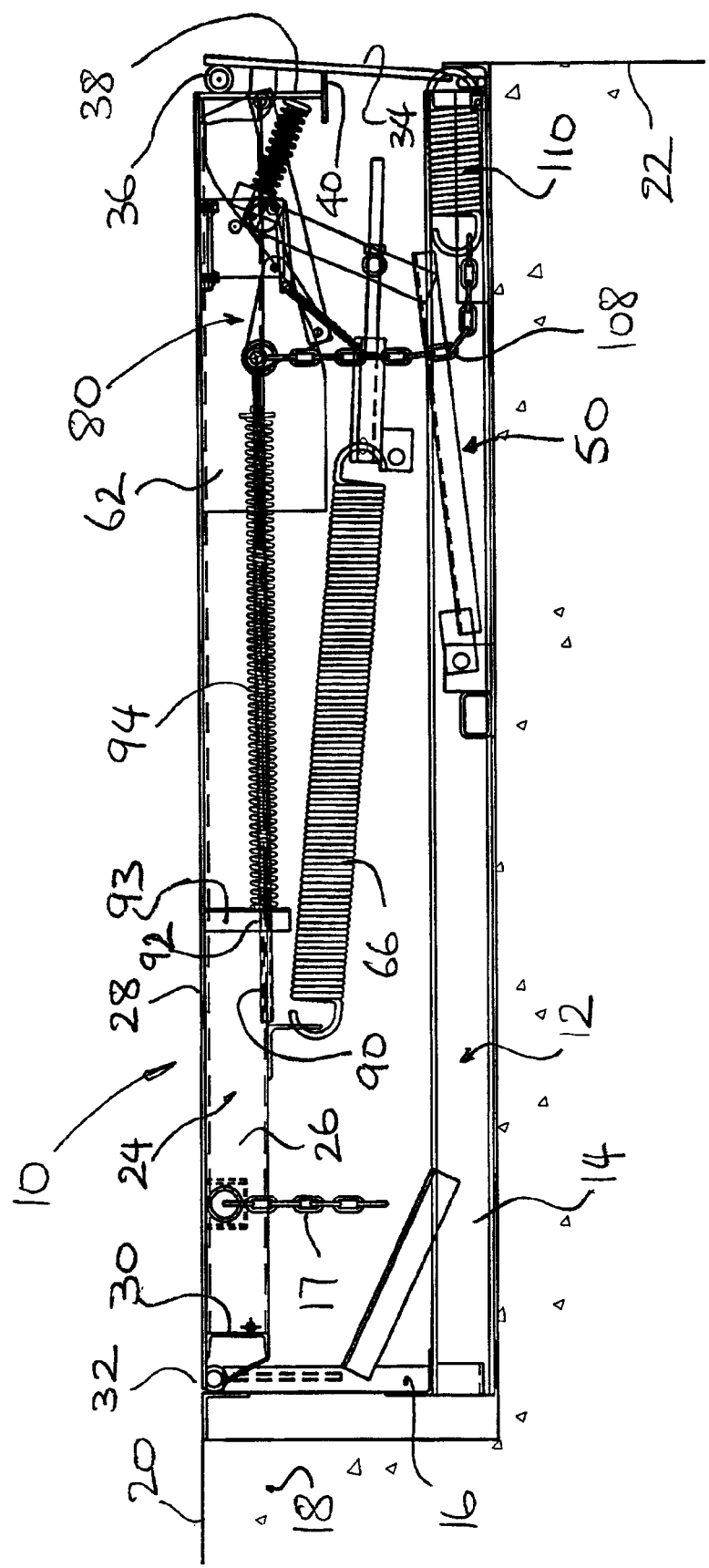
FIG. 1 is a side view of a dock leveler in a stored position.
Figure 2:
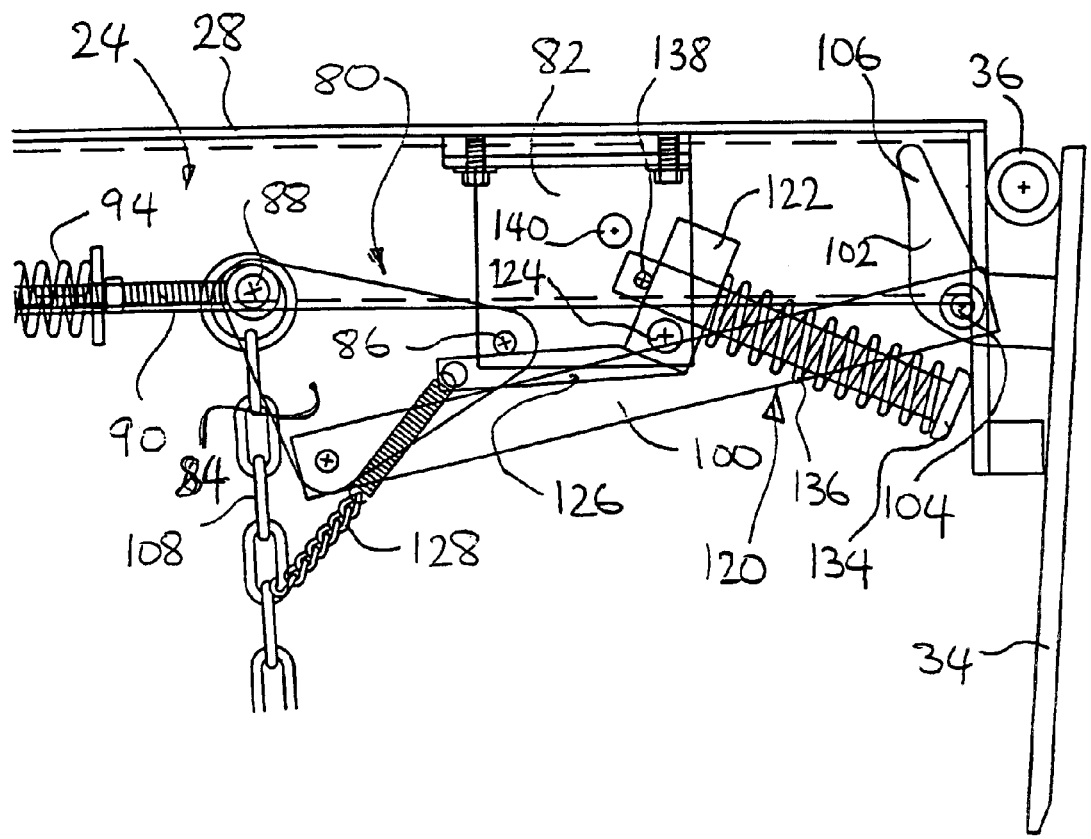
FIG. 2 is an enlarged view of a portion of the dock leveler as shown in FIG. 1.
Figure 3:
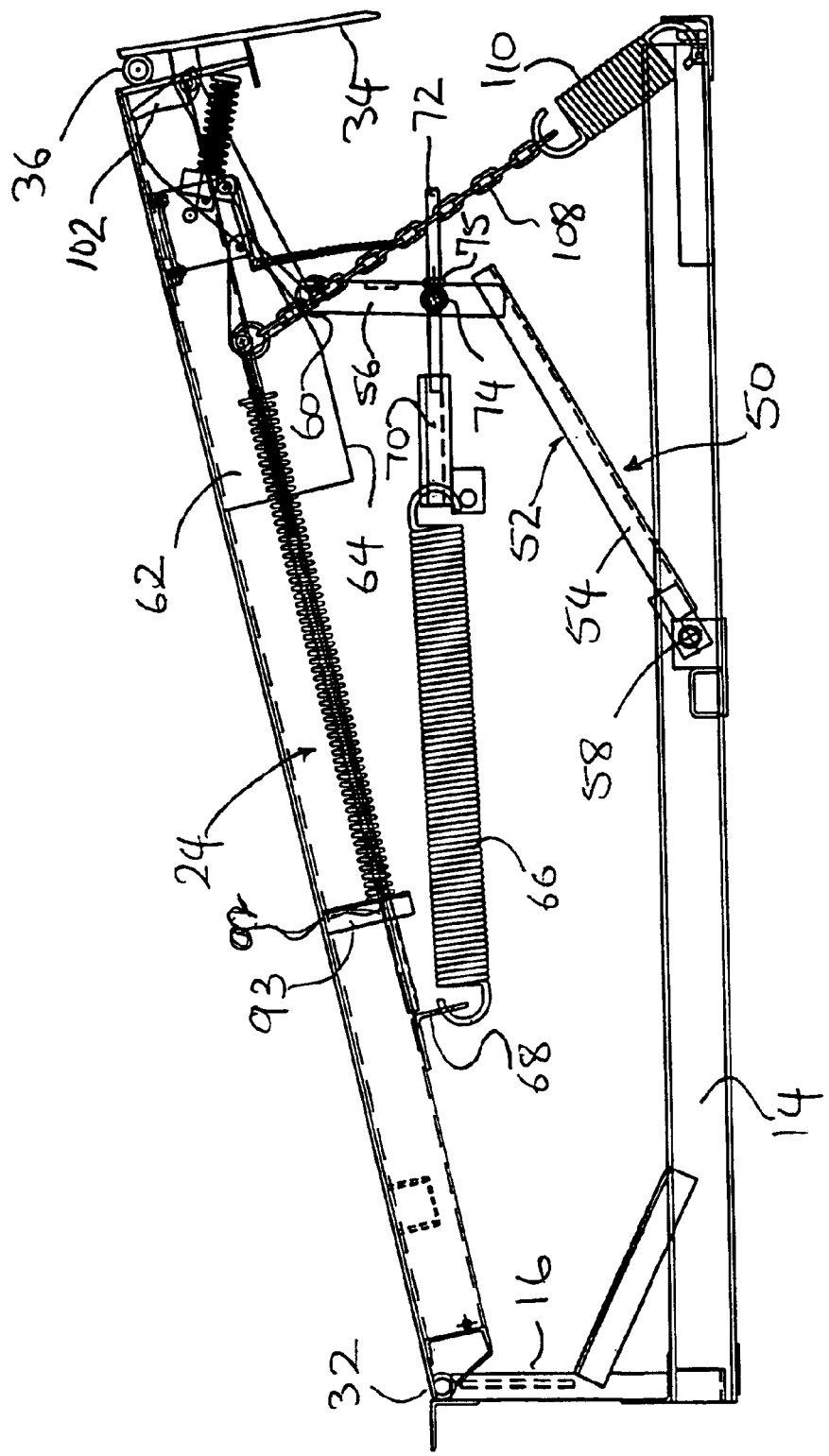
Figure 4:
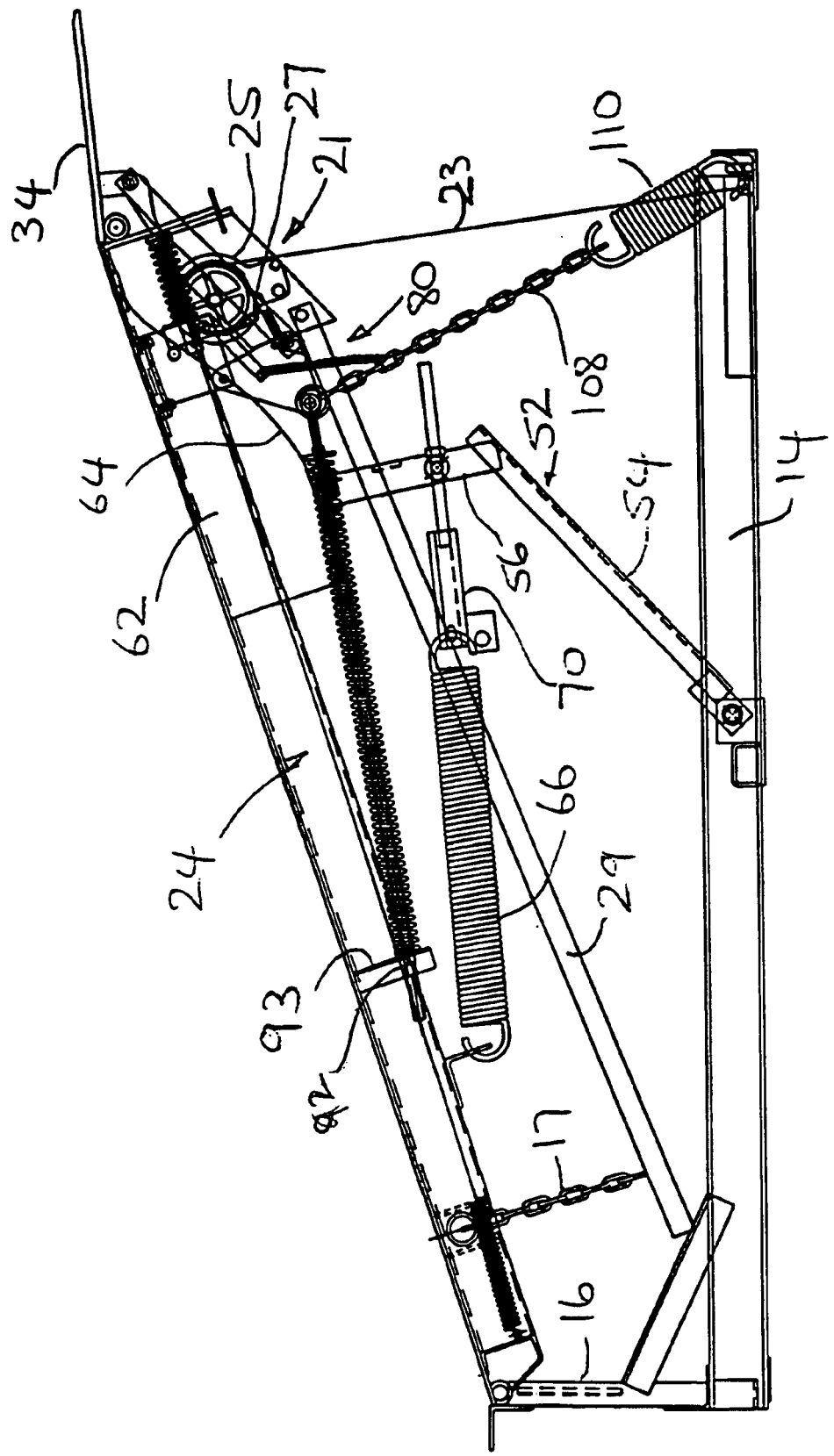
Figure 5:
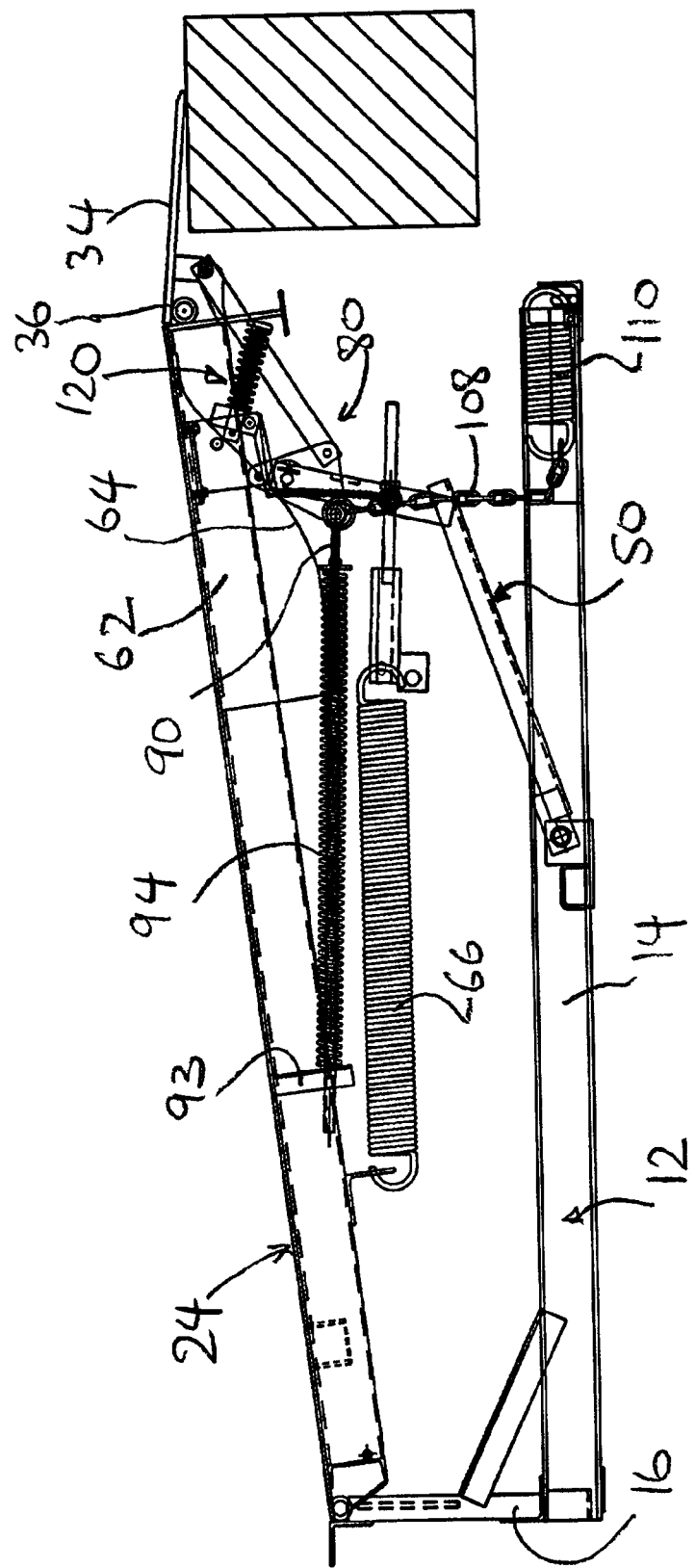
Figure 6:
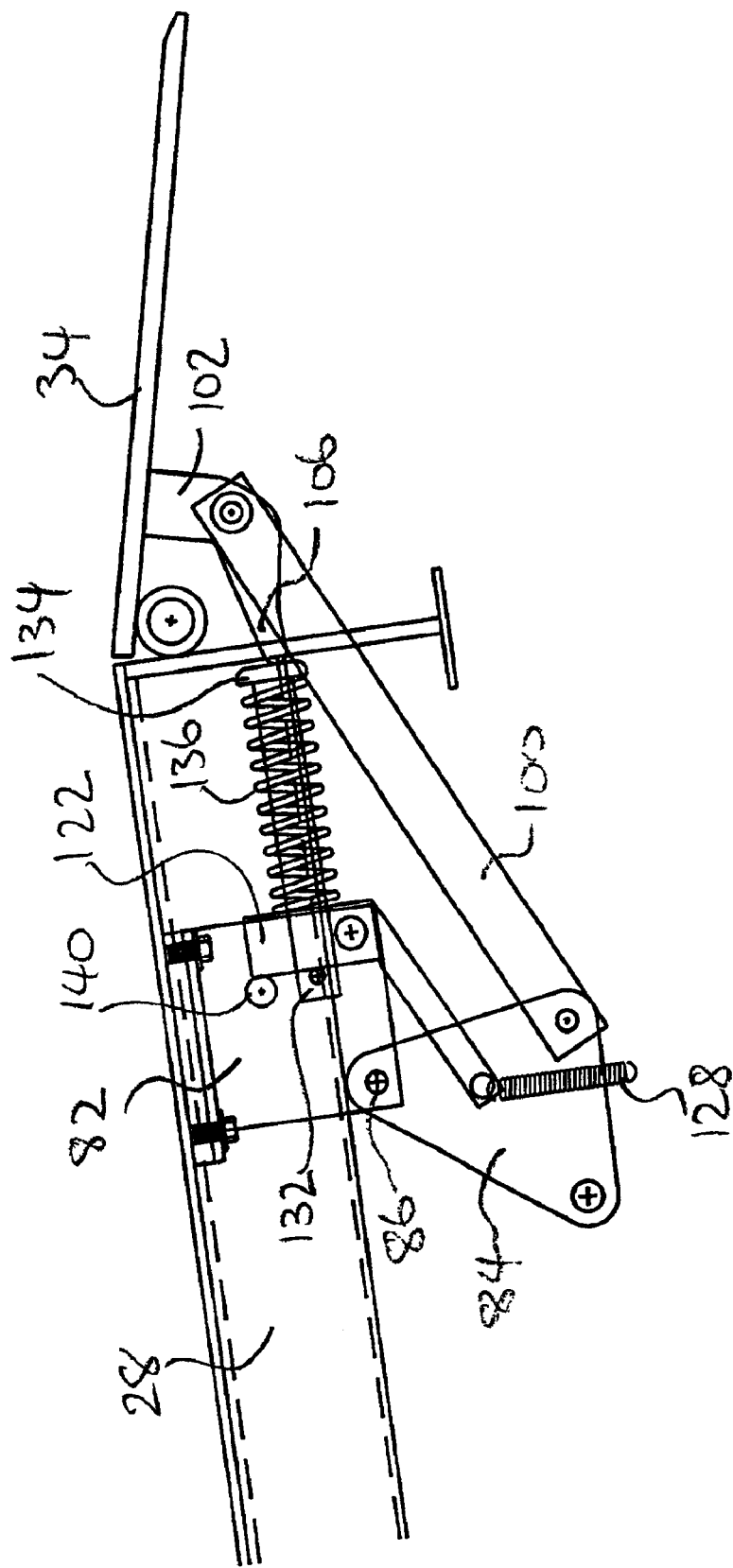
Figure 7:
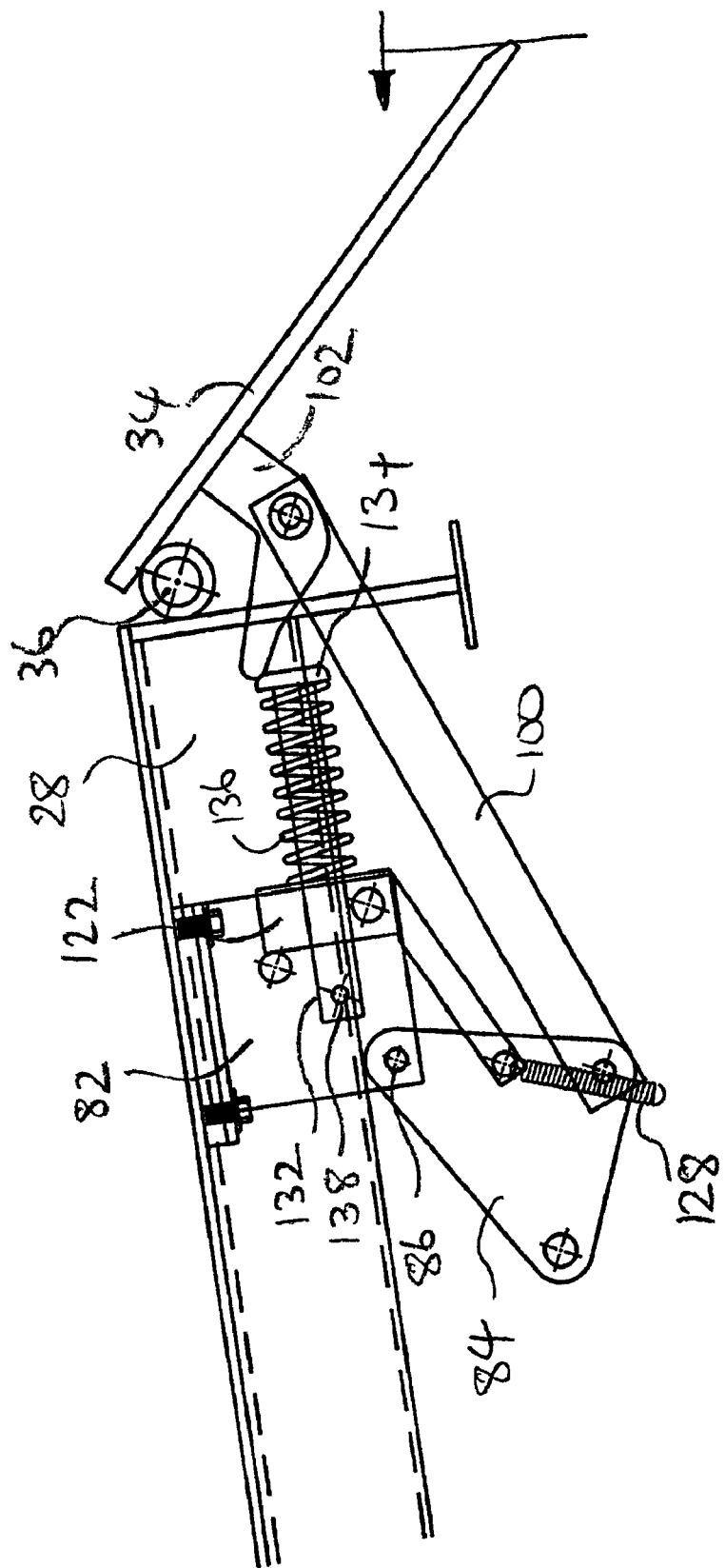

FIG. 3 is a view of the dock leveler of FIG. 1 in a partially elevated position, FIG. 4 is a side view similar to FIG. 3 in a fully elevated position, FIG. 5 is a side view similar to FIG. 4 with the dock leveler in a deployed position, FIG. 6 is a view similar to FIG. 2 with an enlarged portion of the dock leveler in the condition shown in FIG. 4, FIG. 7 is a side view similar to FIG. 6 showing the dock leveler lip in a yielding position.

Figure 8:
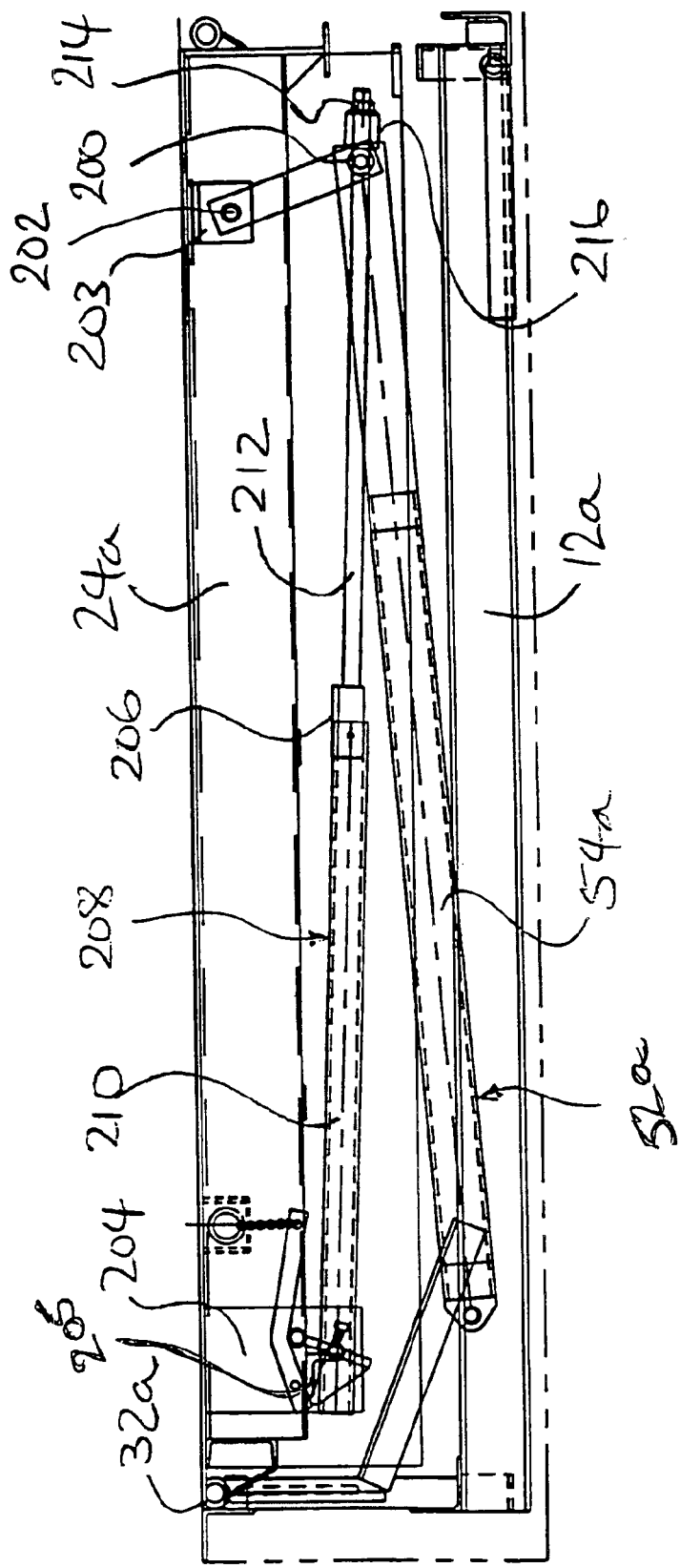
Figure 9:
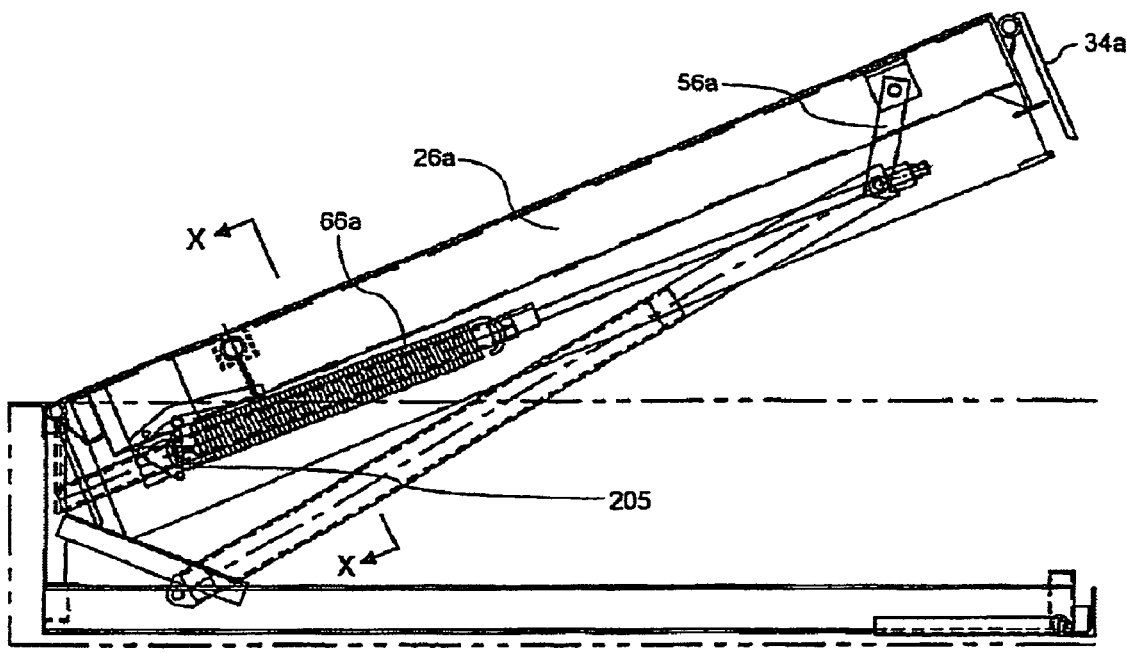
Figure 10:
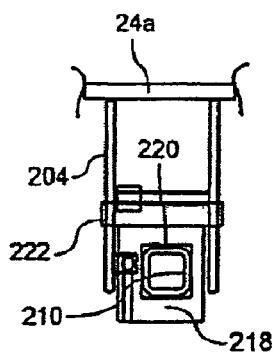
Figure 11:
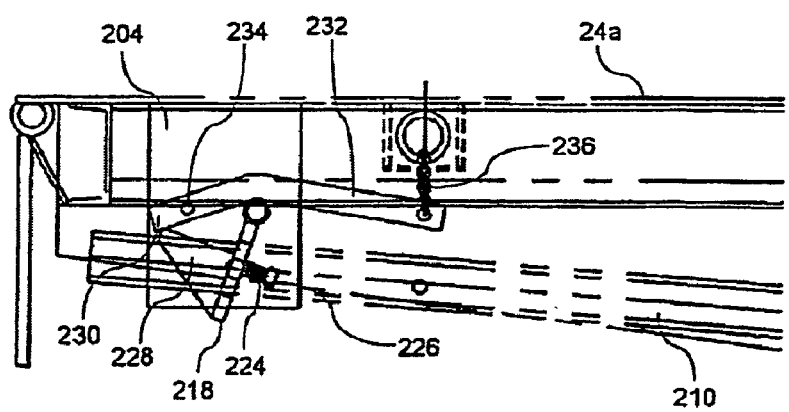
Figure 12:
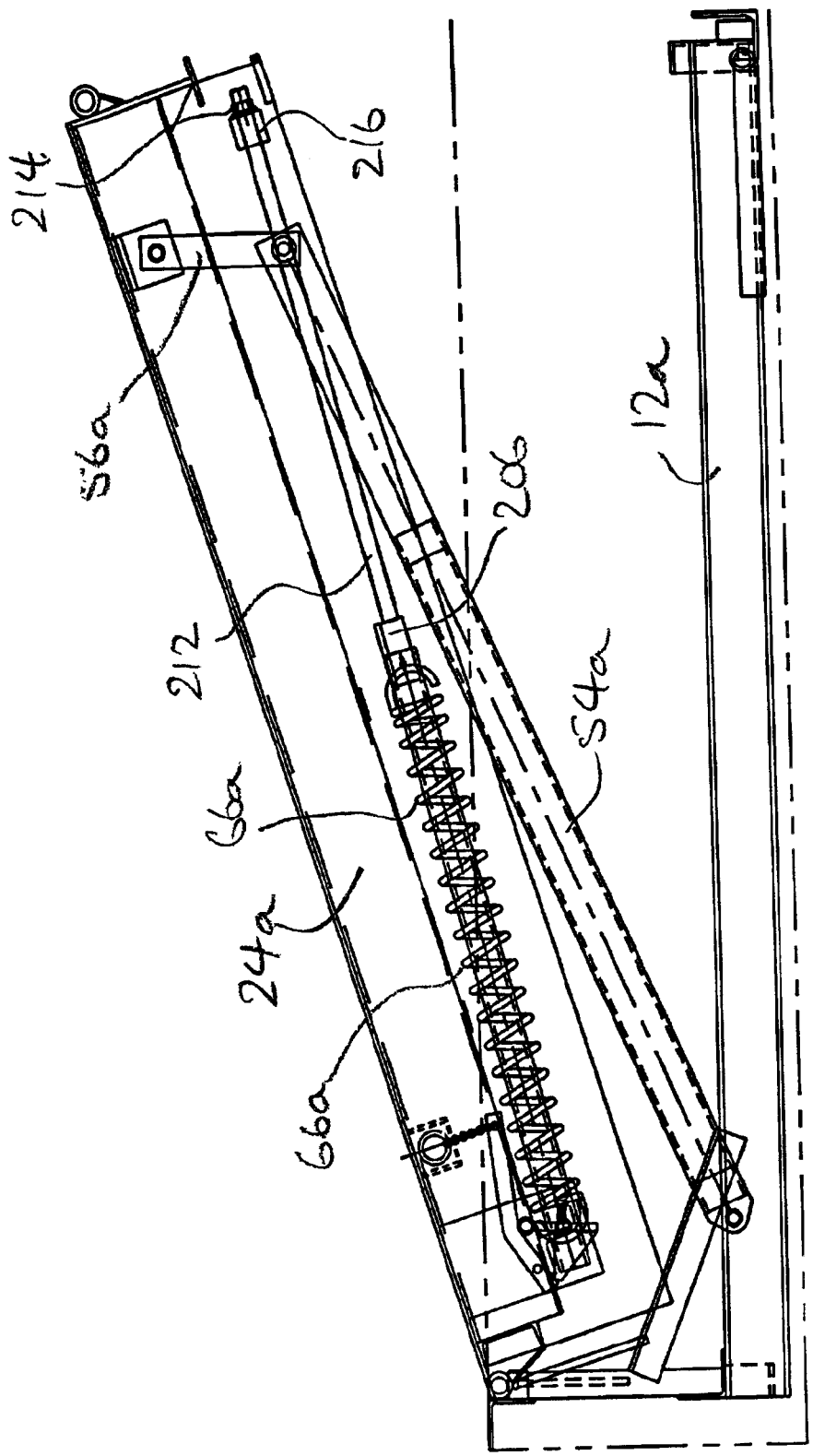

FIG. 8 is a side view of an alternative embodiment of the dock leveler,

FIG. 9 is a side view similar to FIG. 8 in an elevated position,

FIG. 10 is a view of the line X—X of FIG. 9,

FIG. 11 is a side view of the mechanism shown in FIG. 10,

FIG. 12 is a side view similar to FIG. 9 with the leveler floating in an intermediate position.

Referring therefore to the general configuration of dock leveler shown in FIG. 1, the dock leveler 10 includes a main frame 12 having lower frame members 14 and end frame members 16. The frame 12 is secured in a well formed at the edge of a loading dock 18 having an upper surface 20 that approximates the heights of a vehicle to be loaded. The dock 18 has a forward edge 22 to provide an abutment for the vehicle during loading. It will be appreciated that a typical loading dock may have several loading stations each with a dock leveler to accommodate a number of vehicles.

The leveler 10 includes a deck assembly 24 having longitudinal stringers 26 and a deck plate 28. The stringers 26 are interconnected by cross members 30 to provide a secure and rigid construction capable of withstanding the loads typically transferred between the vehicle and dock.

The deck assembly 24 is pivotally connected to the end frame 16 by a hinge 32. The hinge 32 permits relative pivotal movement between the deck assembly 24 and the dock 20. A hold down mechanism 21 operated through a release chain 17 of known construction, and shown in more detail in FIG. 4, controls upward relative movement about the hinge 32 and maintains the dock leveler 10 in the stored position shown in FIG. 1 until released. The hold down mechanism 21 includes a cable 23 wound about a drum 25 controlled by a brake band 27. The brake band 27 is actuated through an elongate lever 29 extending beneath the deck assembly 24 that is pivotally connected to a hold down bracket 31. Upward movement by the lever 29 by the chain 17 thus releases the band brake 27 and allows deployment of the cable 23 from the drum 25. Release of the chain 17 will reengage the brake band 27 to prevent further deployment allowing a ratchet mechanism of the drum to take up the cable 23 as the deck assembly returns toward a stored position.

A lip 34 is located at the opposite end of the deck plate 28 to the hinge 32. The lip 34 extends across the width of the deck assembly 24 and is pivotally connected to the deck plate by a hinge 36 secured to a front plate 38 of the deck assembly 24. A stop 40 is mounted on the front plate 38 to limit pivotal movement of the lip 34.

The deck assembly 24 is moved from the stored position shown in FIG. 1 to an elevated position shown in FIGS. 3 through 6 by a lift mechanism generally indicated at 50. The details of the lift mechanism can be seen more clearly in FIGS. 3 and 4. The lift mechanism 50 includes a cranked lever arm 52 formed from a pair of legs 54, 56. The leg 54 is connected to the frame 12 by a pin 58. The distal end of the leg 56 carries a roller 60 that bears against a cam 62 secured to the underside of the deck plate 28. The cam 62 has a contoured cam surface 64 on its leading edge to modify the pivotal movement induced by the lever arm 52.

Movement of the lever arm 52 is controlled by tension springs 66 acting between a bracket 68 secured to the underside of the deck assembly 24 and a cross support 70. The cross support 70 is connected to a threaded rod 72 that passes through an aperture provided in a pin 74 on the leg 56. The rod 72 is thus connected to the leg 56 and its axial position may be adjusted through the rotation of a nut 75 on rod 72. As can be seen in FIG. 1, the springs 66 are extended in the stored position and release of the hold down by chain 17 allows contraction of the springs 66 and rotation of the lever arm 52 to elevate the deck assembly 24.

Deployment of the lip 34 is controlled by a lip operating mechanism generally indicated at 80 and best seen in FIG. 2. The lip operating mechanism 80 is secured to the underside of the deck plate 28 by a bracket 82. The bracket 82 has a bell crank 84 pivotally secured to one corner by a pin 86. The bell crank 84 is connected by a pivot pin 88 to one end of a push rod 90. The opposite end of the push rod 90 is located in a hole 92 provided in a bracket 93 so that it is free to slide along its axis in the hole 92. A compression spring 94 is located between the bracket 93 and an abutment 96 located on the rod by an adjustment nut 98. The position of the nut 98 on the push rod 90 can be adjusted to vary the compression in the spring 94 to accommodate different lip sizes.

The bell crank 84 is also connected through a link 100 to an L shaped lever 102 secured to the underside of the lip 34. The link 100 is secured by pin 104 to the angle of the lever 102 leaving a profiled radiussed projection 106 extending away from the link 100. Movement of the bell crank 84 about the pin 86 is controlled by a chain 108 extending from the pin 88 to one end of a spring 110 (seen in FIGS. 1 and 3). The opposite end of spring 110 is secured to the frame 12 and provides a degree of resilience and elasticity to the connection between the bell crank 84 and the frame 12. The length of the chain 108 is adjusted such that it is initially flacid as shown in FIG. 1 and becomes tensioned as the deck assembly 24 moves to the elevated position shown in FIGS. 3 and 4.

The bracket 82 also carries a latch mechanism generally indicated at 120 and best seen in FIGS. 2, 6 and 7. The latch mechanism 120 includes a slide block 122 that is pivotally mounted through a pin 124 to the bracket 82. A control arm 126 projects from the slide block 122 and a flexible tensile member comprising a spring and length of chain 128 is secured to the free end of the control arm 126. The opposite end of the cable 128 is secured to a link of the tensile member 10B so that it effectively operates between the frame and the control arm.

The slide block 122 has a central bore 130 which receives a pin 132. The pin 132 has an enlarged head 134 and a compression spring 136 biases the head 134 away from the block 122. A stop 138 is secured to the pin 132 and limits axial movement of the pin 132 relative to the block 122.

A stop pin 140 is provided on the bracket 82 to limit movement of the block 122 in a counter clockwise direction with the pin 86 providing a stop to limit movement in a clockwise direction.

In operation, with the dock leveler in the stored position shown in FIG. 1, the hold down is released through the chain 17 allowing the cable 23 to unwind from the drum 25 and the deck assembly 24 to pivot upwardly about the hinge 32. The tension spring 66 induces the upward movement by acting through the lever arm 52 on the cam 62. During this initial motion the line of action of the push rod 90 is to the upper side of the pin 86 thereby inducing clockwise bias of the bell crank 84 about the pin 86. The bell crank acts through the link 100 to hold the lip 34 against the stop 40. As the deck assembly 24 attains the elevated position in FIG. 3, the chain 108 becomes taught and induces a counter clockwise motion of the bell crank 84 about the pin 86. Continued upward movement of the deck assembly 24 maintains the counter clockwise rotation until the line of action of the rod 90 is to the underside of the pin 86. The compression spring 94 acts against the bracket 93 and continues the counter clockwise motion of the bell crank 84. This motion is transferred through the link 100 and lever 102 to cause pivotal movement of the lip 34 about the hinge 36 toward a bridging position in which it projects from the deck plate 28.

Continued movement towards attainment of the fully elevated position as shown in FIG. 4 causes the cable 128 to act through the control arm 126 and move the slide block 122 about the pin 124. This movement carries the pin 132 to a horizontal position in which the head 134 is positioned in alignment with the tip of the projection 106 on the lever 102. In this position, as shown in FIG. 6, the tip of the lever projection 106 bears against the head 134 which supports the lip in the bridging position. Further movement of the control block 122 is prevented by the stop pin 140 carried on the bracket 82 so that the weight of the lip is effective to hold the control block against the pin.

In the position shown in FIG. 4, which is limited by the chain 108, the lip 34 is located above the floor of the vehicle being positioned against the loading dock. To move the deck assembly 24 into the loading position, downward force is applied to the deck, by walking along the deck typically, which overcomes the bias of the tension spring 66 and allows the deck assembly 24 to move downward. As the deck assembly 24 moves down, the cable 23 winds about the drum 25 and inhibits further upward movement of the deck assembly 24. As the deck assembly 24 moves down, the tension in the chain 108 and cable 128 is relaxed but the spring 136 on the pin 132 continues to support the lip 34 in the deployed position together with the counterbalance of spring 94.

Downward movement of the deck brings the underside of the lip 34 into engagement with the floor of the vehicle and causes a relative movement between the deck plate 28 and the lip 34 about pin 36. This counter clockwise movement, as seen in FIG. 6, causes the tip of the projection 106 to move away from the head 134. The pin 132 cannot move relative to the control block 122 to follow the projection 106 because of the action of the stop pin 138. At the same time, the cable 128 has relaxed due to the downward movement of the deck and thus the control block 122 can pivot about the pin 124 and out of alignment with the projection 106 as seen in FIG. 5. In this condition, the lip 34 is free to pivot relative to the deck plates 28 so that inadvertent removal of the vehicle floor from the underside of the lip 34 or further downward movement to increase loads being placed in the vehicle allows the lip 34 to pivot and either follow movement of the vehicle or fall to the pendent position shown in FIG. 1. The lip 34 can be reset by walking the deck assembly 24 down to the stored position, then releasing the hold down mechanism 21 and allowing the deck assembly 24 to attain the full deployed position.

In the event that the lip 34 is subject to a longitudinal force, for example due to a truck reversing into a deployed lip 34, the spring 136 yields as shown in FIG. 7 allowing the pin 132 to slide relative to the control block 122. This movement allows the projection 106 to move off the head 134 of pin 132 and thus allow the lip to fold downwardly about the hinge 36. Movement of the bell crank induced by the link 100 is accommodated by sliding movement of the push rod 90 in the bracket 93 and by extension of the spring 110 if the deck assembly 24 is in its fully elevated position. Removal of the longitudinal force, for example repositioning of the vehicle will allow the dock leveler to be reset by forcing it to a stored position which allows the control block 122 to pivot about the pin 124 so that the lip 34 can once more be deployed and secured by the latch mechanism 120.

It will be seen therefore from the above description that the latch mechanism 120 provides a stable support for the lip once it has been deployed allowing it to be moved into an operative position. Thereafter, the latch is released allowing normal pivotal movement of the lip 34. The latch mechanism also provides an overload to allow movement of the lip in the event of inadvertent contact with the lip. It will also be noted that this functionality may be achieved in the preferred embodiment with a single aperture in the front plate 38.

In the above embodiment, the hold down mechanism utilises a band brake and cable wound about a drum. An alternative embodiment is shown in FIGS. 8 through 12 in which like reference numerals will be used to identify like components with a suffix a added for clarity. It will be appreciated in the embodiments shown in FIGS. 8 through 12 that the lip deployment mechanism and the latch actuating mechanism has been deleted for clarity although their function is performed substantially identically to that described above.

Referring therefore to FIGS. 8 and 9, deck assembly 24a is pivoted to the frame 12a by a hinge 32a. Lift mechanism 52a includes a pair of legs 54a, 56a which are pivotally connected to one another at a cross pin 200. It will be noted that the cam 62 and roller 60 is deleted and that the leg 56a is pivotally connected to a bracket 203 by a pin 202, the bracket 203 being connected to the deck assembly 24a.

Lift springs 66a (FIG. 9) act between an angle bracket 205 secured to the stringers 26a and a cross support 206 secured to an elongate control rod 208. The control rod 208 has a square section inner member 210 and an outer rod member 212 that are secured to one another at the cross support 206. The rod 212 passes through the cross pin 200 and is secured by a nut 214 threaded on the distal end of the rod 212. A damper bushing 216 is interposed between the nut 214 and the cross pin 200 to provide shock-absorbing capability. As can best be seen in FIGS. 10 and 11, the inner member 210 is slidably received in a latch plate 218 which has a complimentary square aperture 220 of slightly greater size than the member 210. The latch plate 218 is pivotally secured to the brackets 204 by a pin 222. A spring 224 acts between the latch plate 218 and a stop 226 on one of the angle brackets 204 to bias the latch plate 218 about the pin 222 and toward the hinge 32a. A tang 228 is secured to the latch plate 218 and engages one end 230 of a release lever 232. The release lever 232 is pivoted to the brackets 204 by a pivot pin 234 and is connected at its opposite end to a release chain 236.

The aperture 220 in the latch plate 218 is dimensioned such that with the tang 228 against the end 230 of the lever 232 the edges of the aperture 220 engages the upper and lower surfaces of the square member 210 and thereby inhibits relative movement of the member 210 toward the hinge 32a through the latch plate 218. The member 210 is therefore essentially fixed against rearward movement. Upon movement of the latch plate 218 to a more vertical position in which it is generally perpendicular to the axis of the member 210, the aperture 220 permits sliding rearward movement of the member 210.

In operation, the lift springs 66a acts through the cross support 206 to apply a force on the control rod 208 that would move it toward the hinge 32a. The latch plate 218 is in firm engagement with the upper and lower surfaces of the member 210 and prohibits relative movement between the member 210 and the latch plate 218. It will be appreciated that the greater the force exerted by the spring, the greater the force imposed by the latch plate on the rod so that a self servo action is obtained.

To release the dock leveler to the elevated position shown in FIG. 9, the chain 236 is used to move the latch plate 218 to its release position and allow relative sliding movement between the member 210 and the latch plate 218. The lift springs 66a act through the cross beam 206 to move the control rod 208 and cause relative pivotal movement between the legs 54a and 56a. This causes the deck assembly 24a to move upwardly about the hinge 32a until the fully elevated position is attained and the lip is extended as described in the previous embodiment.

The deck assembly is then "walked down" such that the force on the deck assembly is greater than that exerted by the lift springs 66a. This causes the lift mechanism to lower allowing the control rod 208 to move forwardly away from the hinge 32a. The release chain 236 is released but the member 210 is free to slide in the forward direction through the latch plate 218 due to the bias provided by the spring 224.

Upon engagement of the lip with the vehicle, the walk down weight is removed and the control springs again act through the lift mechanism 66a to elevate the deck assembly 24a. However, this movement requires relative rearward movement between the latch plate 218 and the member 210 which is prevented by the action of the latch plate 218 as described above. Upward movement due to the force of the springs 66a is thus prevented.

As the lift assembly continues to be walked down, as the height of the vehicle decreases the latch plate 218 will continue to be adjusted and further upward movement under the influence of the spring 66a prevented.

Should however the vehicle rise, due to, for example, the removal of a load from the vehicle, the lip will carry the deck assembly 24a upwardly to pivot about the pin 32a. Such upward movement is accompanied by a corresponding rotation between the legs 54a and 56a. However, the latch plate 218 securely holds the member 210 so that the deck leveler is effectively free to float upwardly with the vehicle. The rod 212 moves through the cross pin 200 to allow readjustment of the lift arm 52a with the nut 214 and damper 216 projecting from the cross pin 200 as shown in FIG. 12. As the truck moves in and out of the vehicle to reduce the load, the dock is free to float upwardly and downwardly with the trailer to maintain contact at all times. Once unloading has been completed either the latch plate 218 may be released allowing the springs 66a to move the member 210 past the latch plate 218 and counter balance the weight to the leveler or, if the vehicle moves away the dock, it will simply drop until the damper 216 abuts the pin 200. The damper 216 absorbs the shock and prevents unnecessary jarring.

If preferred an elongate damper assembly may be included between the nut 214 and the cross pin 200 to provide a progressive release of the deck assembly 24a.

It will be seen in the embodiments of FIGS. 8 through 12 that the loads imposed on the deck assembly by the hold down mechanism shown in FIGS. 1 through 7 are avoided allowing a floating operation of the deck assembly. However the lip deployment mechanism remains fully operative as previously described to provide optimum deployment of the lip.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A dock leveler comprising a support, a deck assembly pivotally secured to said support at one end for movement between a stored position and an elevated position, a deck lip pivotally connected to said deck at an opposite end to said one end for movement between a pendent stored position and a bridging position projecting from said deck assembly, a lift mechanism acting on said deck assembly to lift it toward said elevated position, a lip operating mechanism operatively connected to said lip to move it from said pendant position to said bridging position upon attainment of said elevated position, and a latch to bold said lip in said bridging position, said latch releasing said lip upon relative movement between said lip and said deck assembly and having a yieldable connection to permit limited pivotal movement between said lip and said deck assembly upon application of a force thereto.

2. A dock leveler according to claim 1 wherein said latch is moved from an inactive position to an active position in engagement with said lip upon said deck assembly attaining said elevated position.

3. A dock leveler according to claim 2 wherein said latch is moved to said active position by a latch setting mechanism, movement of said deck assembly from said elevated position releasing said latch setting mechanism.

4. A dock leveler according to claim 3 wherein said latch setting mechanism includes a lost motion device acting between said support and said deck assembly to accommodate movement of said deck assembly from said elevated position.

5. A dock leveler according to claim 4 wherein said latch is pivotally mounted to said deck assembly and said latch setting mechanism pivots said latch into engagement with said lip upon attainment of said elevated position.

6. A dock leveler according to claim 5 wherein said lost motion device includes a tensile member acting between said support frame and said latch.

7. A dock leveler according to claim 1 wherein said yieldable connection includes a latch spring operable to hold said lip in said bridging position and rotational movement of said lip relative to said deck assembly is accommodated by flexure of said spring.

8. A dock leveler according to claim 7 wherein said latch spring acts upon a link mounted on said lip and rotation of said lip beyond a predetermined position relative to said deck assembly causes said link and spring to disengage and permit said lip to move to said pendent position.

9. A dock leveler according to claim 8 wherein disengagement of said link and latch spring releases said latch to permit said latch to return to said inactive position.

10. A dock leveler according to claim 9 wherein said latch is pivotally connected to said deck assembly and includes a plunger operable upon said link and biased into abutment with said link by said latch spring.

11. A dock leveler according to claim 10 wherein a stop limits movement of said plunger toward said link.

12. A dock leveler according to claim 11 wherein pivotal movement of said latch beyond said active position is inhibited by a stop to maintain said plunger in a position for engagement with said link.

13. A dock leveler according to claim 10 wherein said link has a radiussed tip in abutments with said plunger.

14. A dock leveler according to claim 7 wherein a counterbalance spring acts upon said lip, said counterbalance spring and said latch spring having a combined force sufficient to maintain said lip in said bridging position.

15. A dock leveler according to claim 14 wherein said spring and said counterbalance spring act in parallel upon said lip.

16. A dock leveler comprising a support frame, a deck assembly pivotally secured to said frame at one end for movement between a stored position and an elevated position, a deck lip pivotally connected to said deck assembly at an opposite end to said one end for movement between a pendant stored position and a bridging position projecting from said deck, a lift mechanism acting on said deck to bias it toward said elevated position, a lip operating mechanism operatively connected to said lip to move it from said pendant position to said bridging position upon attainment of said elevated position and including a first tensile member acting between said support frame and said lip to initiate movement from said pendant position as said deck assembly approaches said elevated position, and a latch to hold said lip in said bridging position, said latch being moveable from an inactive position to an active position in which said latch acts upon said lip as said deck assembly approaches said elevated position, said latch having a yieldable connection to permit limited pivotal movement between said lip and said deck assembly upon application of a force thereto.

17. A dock leveler according to claim 16 wherein said latch is moved to said active position by a second tensile member.

18. A dock leveler according to claim 17 wherein said tensile members operate conjointly as said deck assembly approaches said elevated position to move said lip and said latch respectively.

19. A dock leveler according to claim 16 wherein said yieldable connection includes a latch spring acting upon said lip to bias said lip to said bridging position.

20. A dock level according to claim 19 wherein a stop is positioned to limit the action of said latch spring on said lip, pivotal movement of said lip relative to said deck thereby disengaging said lip from said latch and permitting said latch to return to said inactive position.

21. A dock leveler according to claim 20 wherein said latch is pivotally connected to said deck assembly and is maintained in said active position by engagement with said lip when said deck is moved form said elevated position.

22. A dock leveler according to claim 21 wherein said spring acts through a plunger to engage a link secured to said lip, said plunger and link abutting to maintain said latch in said active position.

23. A dock leveler according to claim 22 wherein said stop acts on said plunger to limit movement thereof.

* * * * *

UNITED STATES PATENT AND TRADEMARK OFFICE
CERTIFICATE OF CORRECTION

| | |
|---|---|
| PATENT NO. | : 6,988,289 B2 |
| APPLICATION NO. | : 10/025922 |
| DATED | : January 24, 2006 |
| INVENTOR(S) | : Paul Pedersen et al. |

It is certified that error appears in the above-identified patent and that said Letters Patent is hereby corrected as shown below:

Col. 7, Line 8, Claim 1 should read

-- Claim 1. A dock leveler comprising a support, a deck assembly pivotally secured to said support at one end for movement between a stored position and an elevated position, a deck lip pivotally connected to said deck assembly at an opposite end to said one end for movement between a pendent stored position and a bridging position projecting from said deck assembly, a lift mechanism acting on said deck assembly to lift it toward said elevated position, a lip operating mechanism operatively connected to said lip to move it from said pendant position to said bridging position upon attainment of said elevated position, and a latch to [[bold]] hold said lip in said bridging position upon movement of said deck assembly from said elevated position toward said stored position, said latch releasing said lip upon relative movement between said lip and said deck assembly in a first direction that would move said lip beyond said bridging position and having a yieldable connection to permit limited pivotal movement between said lip and said deck assembly in a direction opposite to said first direction upon application of a force thereto. --.

Col. 8, Line 15, Claim 16 should read

-- Claim 16. A dock leveler comprising a support frame, a deck assembly pivotally secured to said frame at one end for movement between a stored position and an elevated position, a deck lip pivotally connected to said deck assembly at an opposite end to said one end for movement between a pendant stored position and a bridging position projecting from said deck, a lift mechanism acting on said deck to bias it toward said elevated position, a lip operating mechanism operatively connected to said lip to move it from said pendant position to said bridging position upon attainment of said elevated position and including a first tensile member acting between said support

UNITED STATES PATENT AND TRADEMARK OFFICE
CERTIFICATE OF CORRECTION

PATENT NO. : 6,988,289 B2
APPLICATION NO. : 10/025922
DATED : January 24, 2006
INVENTOR(S) : Paul Pedersen et al.

It is certified that error appears in the above-identified patent and that said Letters Patent is hereby corrected as shown below:

frame and said lip to initiate movement from said pendant position as said deck assembly approaches said elevated position, and a latch to hold said lip in said bridging position upon movement of said deck assembly from said elevated position toward said stored position, said latch being moveable from an inactive position to an active position <u>upon movement of said deck assembly from said elevated position toward said stored position,</u> in which said latch acts upon said lip as said deck assembly approaches said elevated position, said latch having a yieldable connection to permit limited pivotal movement between said lip and said deck assembly upon application of a force thereto. --.

Signed and Sealed this

Seventeenth Day of March, 2009

JOHN DOLL
*Acting Director of the United States Patent and Trademark Office*